United States Patent
Nguyen et al.

(10) Patent No.: US 9,378,277 B1
(45) Date of Patent: Jun. 28, 2016

(54) SEARCH QUERY SEGMENTATION

(71) Applicant: Amazon Technologies, Inc., Reno, NV (US)

(72) Inventors: Lam Duy Nguyen, Seattle, WA (US); Nigel St. John Pope, Shoreline, WA (US); Yanping Huang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 398 days.

(21) Appl. No.: 13/763,052

(22) Filed: Feb. 8, 2013

(51) Int. Cl.
 *G06F 7/00* (2006.01)
 *G06F 17/30* (2006.01)

(52) U.S. Cl.
 CPC .... *G06F 17/30707* (2013.01); *G06F 17/30427* (2013.01)

(58) Field of Classification Search
 CPC .............. G06F 17/30864; G06F 17/30657; G06F 17/30672; G06F 17/30707
 USPC ............................ 707/759, 999.003, 767, 739
 See application file for complete search history.

(56) References Cited

U.S. PATENT DOCUMENTS

| | | | |
|---|---|---|---|
| 7,779,009 B2 * | 8/2010 | Chowdhury et al. .......... 707/737 |
| 8,010,537 B2 * | 8/2011 | Prasad Kantamneni ....... G06F 17/3097 707/748 |
| 2004/0199498 A1 * | 10/2004 | Kapur et al. ...................... 707/3 |
| 2006/0259467 A1 * | 11/2006 | Westphal ........................... 707/3 |
| 2007/0050393 A1 * | 3/2007 | Vogel ................ G06F 17/30864 |
| 2008/0222094 A1 * | 9/2008 | Cox ......................... G06F 19/22 |
| 2011/0029541 A1 * | 2/2011 | Schulman ...................... 707/748 |
| 2011/0231347 A1 * | 9/2011 | Xu et al. .......................... 706/12 |
| 2012/0191745 A1 * | 7/2012 | Velipasaoglu et al. ........ 707/767 |

* cited by examiner

*Primary Examiner* — James Trujillo
*Assistant Examiner* — John J Morris
(74) *Attorney, Agent, or Firm* — Thomas | Horstemeyer, LLP

(57) ABSTRACT

Disclosed are various embodiments for a search query segmentation application. Search queries are broken into segments. Each of the segments is assigned a taxonomy node from a catalog of items. Search results are generated as those items included in the taxonomy nodes assigned to the search query segments.

21 Claims, 4 Drawing Sheets

SEARCH QUERY SEGMENTATION

BACKGROUND

As the length of a search query increases, the likelihood of finding matching products decreases. This may result in fewer purchases and reduced customer satisfaction due to an inability to find relevant products.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Search algorithms of electronic commerce systems typically return those items which match a search query applied to a catalog of items. As search queries increase in length, the number of keywords that an item must match in order to appear in search results also increases. Additionally, the opportunity for misspellings or inclusion of irrelevant keywords also increases with the length of the search query. Such long search queries may have no matching search results, leading to a lost opportunity to present purchasable items to a customer.

A query segmentation application breaks a search query into several search query segments, each segment comprising one or more keywords of the search query. The search query segments are then each matched with a taxonomy node having an attribute and a corresponding value from the catalog of items. For example, the search query "Brand X Black Running Shoes 12" may be broken down into the segments "Brand X," "Black," "Running Shoes," and "12." These segments may then be matched with taxonomy nodes "Brand: Brand X," "Shoe color: black," "Item category: running shoes," and "Shoe size: 12," respectively. The search query segmentation application may then return those items from the catalog included in the taxonomy nodes matched to the segments.

Segments including misspelled keywords can be matched with taxonomy nodes having similar labels, thereby eliminating the problem of finding no items matching the misspelled keyword. Search queries with extraneous keywords can be matched with a relevant browse node, preventing the extraneous keywords from negatively impacting the search results.

In the following discussion, a general description of the system and its components is provided, followed by a discussion of the operation of the same. Although the system is discussed in the context of an electronic commerce system, it is understood that the query segmentation application may be applied to any system in which items for search results are organized into a taxonomy. Additional techniques for generating search results from a taxonomy are described in U.S. patent application entitled "Generating Search Results From A Taxonomy" filed on Feb. 2, 2010 and assigned application Ser. No. 12/698,235, which is incorporated by reference in its entirety.

Figure 1:
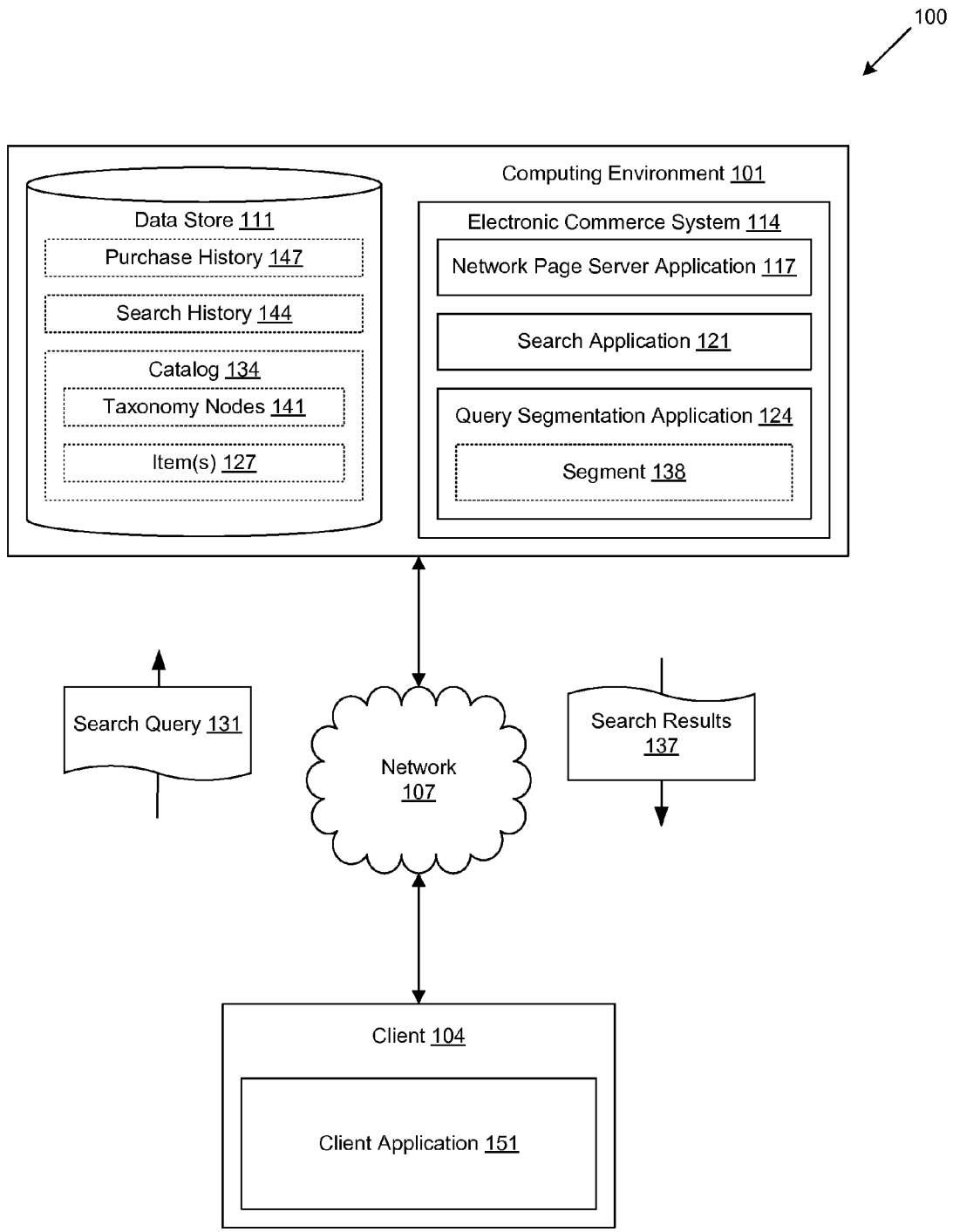
FIG. 1 is a drawing of a networked environment according to various embodiments of the present disclosure.

With reference to FIG. 1, shown is a networked environment 100 according to various embodiments. The networked environment 100 includes a computing environment 101 and a client device 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include electronic commerce system 114 having a network page server application 117, a search application 121, and a query segmentation application 124, and other applications, services, processes, systems, engines, or functionality not discussed in detail herein.

The electronic commerce system 114 is executed in order to facilitate the online purchase of items 127 over the network 107. The electronic commerce system 114 also performs various backend functions associated with the online presence of a merchant in order to facilitate the online purchase of items 127 as will be described. For example, the electronic commerce system 114 implements a network page server application 117 that generates network pages such as web pages or other types of network content that are provided to clients 104 for the purposes of selecting items for purchase, rental, download, lease, or other form of consumption as will be described.

The search application 121 applies search queries 131 obtained from clients 104 to a catalog 134 of items 127 to generate search results 137 comprising those items 127 responsive to the search query 131. The search query 131 may comprise keywords to be matched to descriptions or attributes of an item 127 to generate search results 137. The search query 131 may also comprise data or metadata to limit the scope of a performed search, such as to a particular item 127 category, or other data. Items 127 comprise those products or services available for sale, rental, lease, or acquisition through the electronic commerce system. For example, items 127 may comprise physical goods, services, digital content, or other products.

The query segmentation application 124 generates segments 138 of an obtained search query 131 and matches those segments 138 with a taxonomy node 141 of the catalog 134. The query segmentation application 124 then communicates with the search application 121 to generate search results 137 responsive to the search query 131 as those items 127 included in the taxonomy nodes 141 matched to the segments 138 of the search query 131.

To this end, the query segmentation application 124 first generates segments 138 from the search query 131, each segment 138 comprising one or more of the keywords of the search query 131. For example, the search query 131 "Brand X Black Running Shoes 12" may result in segments 138 "Brand X," "Black," "Running Shoes," and "12." To generate the final segments 138 of the search query 131, the query segmentation application 124 first generates a pool of segments 138 embodying every combination of the keywords of the search query 131 which maintain the ordering of the keywords as they appear in the search query 131. For example, the query segmentation application 124 may generate segments 138 for the search query 131 in this example such as "Brand," "X Black Running," and "Running Shoes 12," but not "Black Running 12" where the keyword "Shoes" is omitted from the segment, or "Running 12 Brand," where the keywords are in a different order than they appeared in the search query 131.

Each segment 138 in the pool of segments 138 is assigned a score for determining which segments 138 will be included in the final segments 138 of the search query 131. The score for a segment 138 may be calculated as a function of a normalized frequency of occurrence of the segments 138 in a search history 144. For example, for a search query 131 "New York Times Bestselling" which occurs 12,000 times in a search history 144, the score for unigram segments 138, i.e. those segments 138 comprising one word, may be a function of the normalized frequency of the unigrams "New," "York," "Times," and "Bestselling," each having a normalized frequency of 3,000. The score may also be a function of the normalized frequency of the bigrams, i.e. comprising two words, "New York," "York Times," and "Times Bestselling," each having a normalized frequency of 6,000. Other n-grams may also be used to generate the score as can be appreciated.

The score for each segment 138 may also be calculated as a function of whether a segment 138 matches a label of a taxonomy node 141. For example, the score of a segment 138 "Brand X" may be multiplied by a positive constant because it matches a taxonomy node 141 for the item 127 brand "Brand X." Additionally, the score for a segment 138 may be a function of a length or a number of keywords included in the segment. For example, the segment 138 for "New York" will always have a greater n-gram frequency than "New York Times" with respect to the search history 144, but the longer "New York Times" segment 138 may be preferred. Accordingly, the score for the "New York Times" segment 138 may be weighted to reflect the preference for longer segments. Scores for the segments 138 may also be calculated by another approach.

After each segment 138 in the pool of segments 138 has been calculated, the final selection of segments 138 is made from the pool as a function of the scores. The final selection of segments 138 will comprise a subdivision of the keywords of the search query 131. Selecting the final segments 138 may comprise a maximization algorithm to obtain a maximum summation of scores with respect to the final segments, or another approach.

The query segmentation application 124 attempts to match each of the final segments 138 to a taxonomy node 141. To this end, the query segmentation application 124 generates a plurality of modified search queries 131 by, for each of the final segments, excluding the segment 138 from the original search query 131. For example, the search query 131 "Brand X Black Running Shoes 12" having segments 138 "Brand X," "Black," "Running Shoes," and "12" would generate the modified search queries 131 "Black Running Shoes 12," "Brand X Running Shoes 12," and "Brand X Black Running Shoes." The query segmentation application 124 then queries the search application 121 for search results 137 for each of the modified search queries 131.

The items 127 included in the combined search results 137 for the modified search queries 131 will be included in multiple taxonomy nodes 141 of the catalog 134. Scores are calculated for each of the taxonomy nodes 141 embodied by the combined search results 137 for the modified search queries 131 as a function of a frequency of an item 127 in the search results 137 being included in the respective taxonomy node 141, or by another approach.

Next, a subset of the scored taxonomy nodes 141 is excluded if their score falls below a threshold, or if they meet some other criteria. Each of the segments 138 is then matched with a scored taxonomy node 141. In some embodiments, a segment 138 is matched with a taxonomy node 141 having the highest degree of similarity with respect to a label of the taxonomy node 141 and the segment. For example, the degree of similarity may be calculated as one minus the edit distance between the segment 138 and the taxonomy node 141 label divided by the length of the longer string. The edit distance may be defined as a number of characters in a string that must be added, removed, or edited to transition from one string to another. In such an example, the segment 138 "blueray" and a taxonomy node 141 label "blu-ray" will have an edit distance of 1, thereby resulting in a similarity of $1-\frac{1}{7}=\frac{6}{7}$.

As another example, the degree of similarity may be calculated as a function of a cosine similarity between a segment 138 and a taxonomy node 141 label. The cosine similarity may be defined as the angle between two strings transformed into a vector space as determined by the Euclidian cosine rule. For example, the segment 138 "Shakespeare William" and the taxonomy node 141 label "William Shakespeare" will have a cosine similarity of 1. As another example, the similarity may be the maximum value of multiple approaches to calculating the similarity, such as the maximum of the cosine similarity and one minus the edit distance divided by the length of the longest string. Other approaches may also be used to calculate the degree of similarity.

In some embodiments, a segment 138 is matched with a taxonomy node 141 with whose label it shares the highest degree of similarity responsive to the degree of similarity being above a threshold. In such an embodiment, responsive to no taxonomy node 141 having a degree of similarity above the threshold with respect to a segment 138, the segment 138 may be matched with a default taxonomy node 141 such as the taxonomy node 141 having the highest score calculated as a function of the search results 137 of the modified search queries 131 as discussed above. For example, the search query 131 for "William Shakespeare A Midsummer Night's Crucible e-book" may result in taxonomy nodes 141 for "Author: William Shakespeare," "Category: Plays," and "Format: e-book." A segment 138 "A Midsummer Night's Crucible" for which a similarity score is not calculated to be above a threshold may then be matched with the "Category: Plays" taxonomy node 141. This minimizes the effect of extraneous or misplaced keywords of the search query 131 such as "Crucible" on the final generated search results 137.

In other embodiments, responsive to no taxonomy node 141 having a degree of similarity above the threshold with respect to a segment 138, the segment 138 may not be matched with a taxonomy node 141. Other approaches may also be used to match taxonomy nodes 141 to segments 138.

After the segments 138 have been matched with a taxonomy node 141, the query segmentation application 124 communicates with the search application 121 to generate search results 137 comprising those items 127 included in the matched taxonomy nodes 141. In embodiments in which a segment 138 is not matched with a taxonomy node 141, the search results 137 may comprise those items 127 included in the taxonomy nodes 141 and responsive to the unmatched segment 138.

In some embodiments, the search results 137 may comprise those items 127 included in taxonomy nodes 141 in addition to those matched to segments 138. For example, the query segmentation application 124 may infer additional taxonomy nodes 141 from a user preference, user profile, or purchase history 147 of a user. For example, the query segmentation application 124 may infer a taxonomy node 141 for a shoe size from previously purchased items 127 included in that taxonomy node. Other approaches may also be used to generate the search results 137. The search results 137 are then communicated to the client 104.

The data stored in the data store 111 includes, for example, a purchase history 147, a search history 144, a catalog 134 of items 127 organized into taxonomy nodes 141, and potentially other data. The purchase history 147 comprises data representative of transactions previously consummated through the electronic commerce system 114. The search history 144 comprises data representative of search queries 131 previously submitted to the electronic commerce system 114.

The catalog 134 comprises items 127 organized into a taxonomy embodied by taxonomy nodes 141. Taxonomy nodes 141 may be represented by an attribute and a corresponding value or label. For example, taxonomy nodes 141 may comprise groupings such as item 127 categories, subcategories, departments, or other groupings. Taxonomy nodes 141 may also comprise a refinement, or limiter to those items 127 included in a parent taxonomy node 141. For example, a taxonomy node 141 for an item 127 category attribute may have a label "running shoes," and would thereby include all items 127 in that category. A taxonomy node 141 for a shoe size attribute having a particular label may include all items 127 whose item description or metadata includes a shoe size corresponding to the label of the respective taxonomy node 141.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 151 and/or other applications. The client application 151 may be executed in a client 104, for example, to access network content served up by the computing environment 101 and/or other servers. To this end, the client application 151 may comprise, for example, a browser, a dedicated application, etc. The client 104 may be configured to execute applications beyond the client application 151 such as, for example, email applications, social networking applications, word processors, spreadsheets, and/or other applications.

Next, a general description of the operation of the various components of the networked environment 100 is provided. To begin, the electronic commerce system 114 obtains a search query 131 from a client 104. The search query 131 may be obtained from a browser client application 151 rendering a network page served by the network page server application 117, obtained from a dedicated client application 151, or by another approach.

The query segmentation application 124 then generates segments 138 from the search query 131. In some embodiments, this comprises generating n-gram segments 138 from the keywords of the search query 131 and calculating, for each of the segments 138, a normalized frequency as a function of previously submitted search queries 131 embodied in a search history 144. The normalized frequency of a segment 138 may be weighted as a function of the length of the segment 138. The normalized frequency of a segment 138 may also be weighted responsive to the segment 138 matching a label of a taxonomy node 141. The normalized frequency of the segments 138 may also be calculated by another approach.

The query segmentation application 124 then selects those segments which, in combination, maximize a total normalized frequency and embody all the keywords of the search query 131. The selected segments 138 comprise a subdivision of the keywords of the search query 131. The segments 138 may also be selected by another approach.

Next, for each of the segments 138, the query segmentation application 124 generates modified search queries 131 by removing the respective segment 138 from the search query 131. For example, the search query 131 "Brand X Black Running Shoes 12" having segments 138 "Brand X," "Black," "Running Shoes," and "12" may generate the modified search queries 131 "Black Running Shoes 12," "Brand X Running Shoes 12," and "Brand X Black Running Shoes."

The query segmentation application 124 then queries the search application 121 to generate an aggregate search result 137 comprising the individual search results 137 responsive to each of the modified search queries 131. Each of the taxonomy nodes 141 embodied in the aggregated search results 137 is scored according to a frequency of associated items 127 being included in the aggregated search results 137. The scores of the taxonomy nodes 141 are then used to generate a subset of the taxonomy nodes 141 whose scores exceed a threshold, the subset being representative of those of the taxonomy nodes 141 which are most relevant to the search query 131.

After selecting the relevant subset of the taxonomy nodes 141, the query segmentation application 124 then attempts to match each of the segments 138 to one of the relevant taxonomy nodes 141. This may comprise, for example, matching a segment 138 to the one of the taxonomy nodes 141 with whose label the segment 138 has the highest degree of similarity. The degree of similarity may be calculated as a function of an edit distance between the segment and the label of the taxonomy node 141, a cosine similarity, or another value.

In some embodiments, the query segmentation application 124 matches a segment 138 to the taxonomy nodes 141 with whose label the segment shares the greatest degree of similarity responsive to the degree of similarity meeting or exceeding a threshold. In such an embodiment, the query segmentation application 124 may match a segment 138 having no similar taxonomy nodes 141 to a default taxonomy node 141, such as the taxonomy node 141 having the highest score calculated as a function of item 127 frequency in aggregated search results 137 responsive to modified search queries 131 as discussed above. In other embodiments, in which a segment 138 has no similar taxonomy nodes 141, the segment 138 remains unmatched. Matching taxonomy nodes 141 with segments 138 may also be performed by another approach.

The query segmentation application 124 then queries the search application 121 to generate search results 137 comprising items 127 included in the taxonomy nodes 141 matched to the segments 138. In embodiments in which a segment 138 is not matched with a taxonomy node 141, the search results 137 may comprise items 127 included in the matched taxonomy nodes 141 and further responsive to the unmatched segments 138. Search results 137 may also be generated by another approach. The generated search results 137 are then communicated to the client 104 via the network 107.

Figure 2:
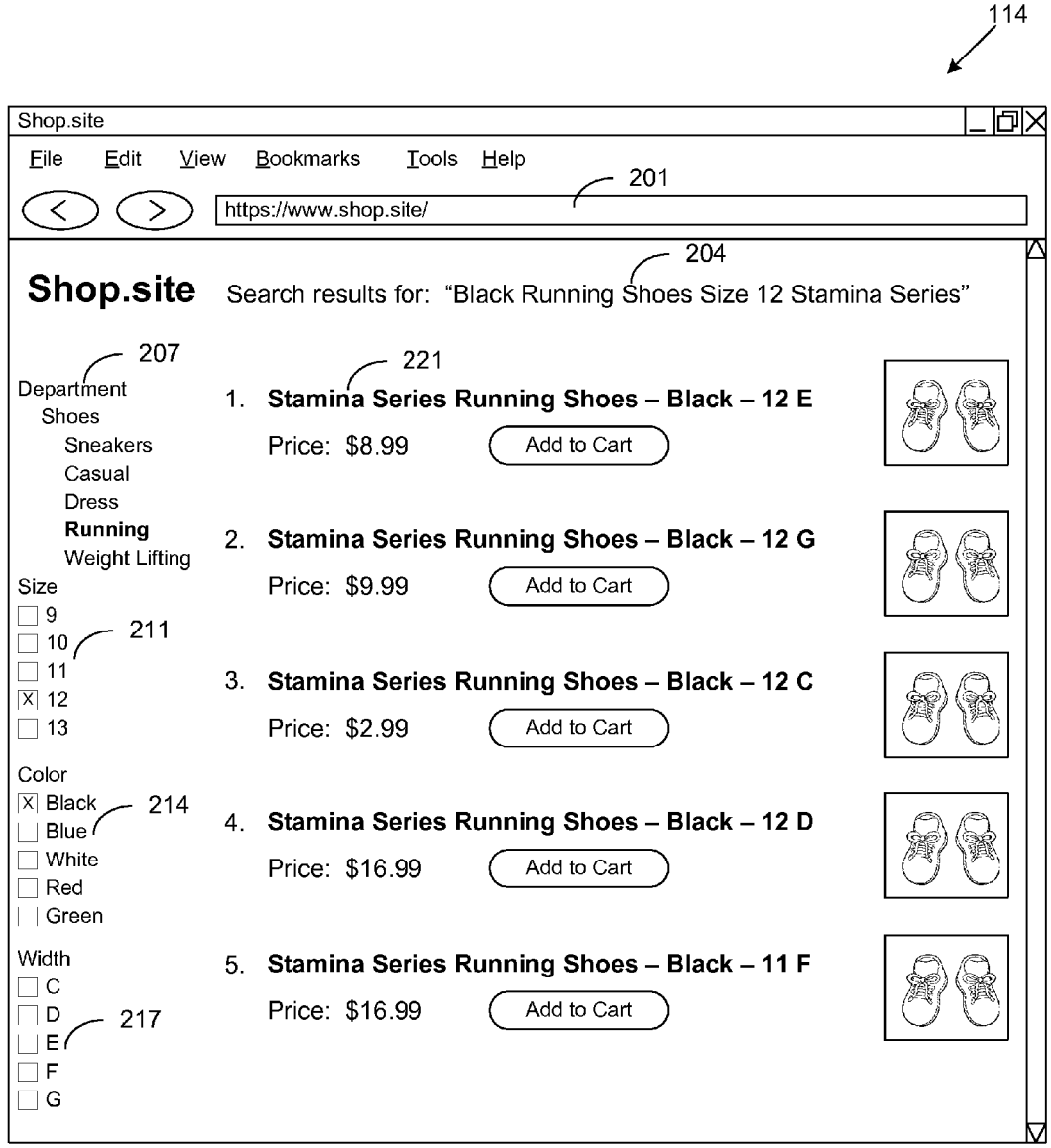
FIG. 2 is a drawing of an example of a user interface rendered by a client in the networked environment of FIG. 1 according to various embodiments of the present disclosure.

Referring next to FIG. 2, shown is an example user interface generated by the electronic commerce system 114 (FIG. 1) implementing the query segmentation application 124 (FIG. 1) and executed in the computing environment 101 (FIG. 1) of the networked environment 100 (FIG. 1). In some embodiments, the user interface may comprise a network page served by a network page server application 117 (FIG. 1) for rendering by a browser client application 151 (FIG. 1). In other embodiments, the user interface may comprise data encoded for rendering by a dedicated client application 151.

Component 201 is a uniform resource locator (URL) directed to the electronic commerce system 114. Component 204 is a search query 131 (FIG. 1) submitted to the electronic commerce system 114 from a client 104 (FIG. 1) via a network 107. In this example, the search query 131 is "Black Running Shoes Size 12 Stamina Series" which is segmented into segments 138 "Black," "Running Shoes," "Size 12," and "Stamina Series" due to the current state of a search history 144 (FIG. 1) accessible to the electronic commerce system 114. Components 207, 211, and 214 are navigation elements which, when selected, limit the search results 137 (FIG. 1) to those items 127 (FIG. 1) included in the selected product category, shoe size, or shoe color taxonomy node 141, respectively.

Component 207 is directed to a product category taxonomy node 141, with the "Running Shoes" category indicated as an active search focus, due to the query segmentation application 124 matching the segment "Running Shoes" with the "Category: running shoes" taxonomy node 141. Component 211 is directed to a shoe size taxonomy node 141, with the "size 12" option being automatically selected due to the "Size 12" segment being matched with a "Shoe size: 12" taxonomy node 141 by the query segmentation application 124. Component 214 is directed to a shoe color taxonomy node 141, with the "black" option being automatically selected due to the "Black" segment being matched with a "Shoe color: black" taxonomy node 141 by the query segmentation application 124. Component 217 is directed to a shoe width taxonomy node 141, but no option is selected as no segment 138 was matched with a shoe width taxonomy node 141.

Component 221 is a listing of search results 137 (FIG. 1) comprising those items 127 included in the taxonomy nodes 141 embodied by items 207, 211, and 214. Additionally, as the "Stamina Series" segment 138 was not matched with a taxonomy node 141, the search results 137 of item 221 are further responsive to the "Stamina Series" segment 138.

Figure 3:
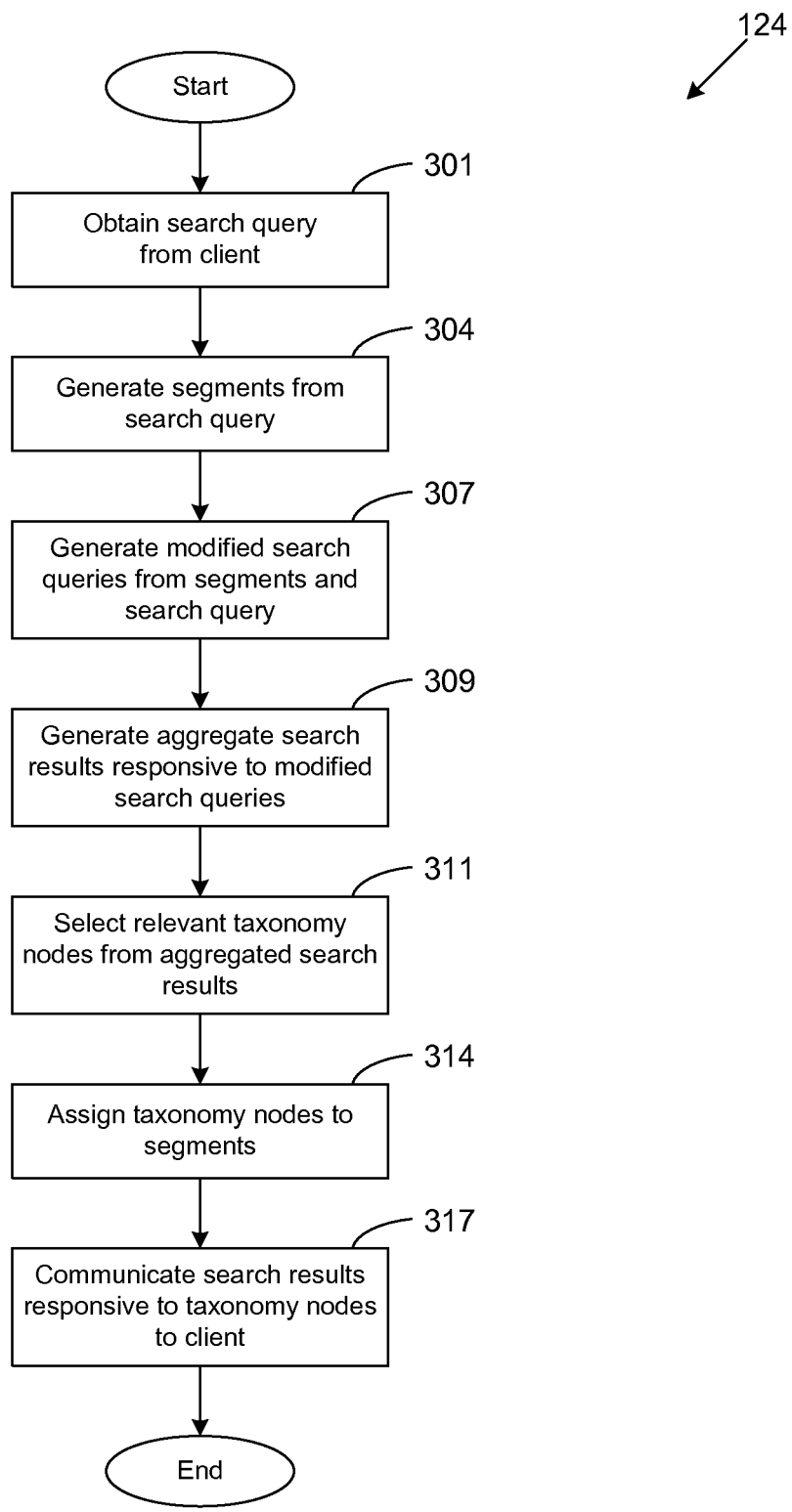
FIG. 3 is a flowchart illustrating one example of functionality implemented as portions of a query segmentation application executed in a computing environment in the networked environment of FIG. 1 according to various embodiments of the present disclosure.

Turning now to FIG. 3, shown is a flowchart that provides one example of the operation of a portion of the query segmentation application 124 (FIG. 1) according to various embodiments. It is understood that the flowchart of FIG. 3 provides merely an example of the many different types of functional arrangements that may be employed to implement the operation of the portion of the query segmentation application 124 as described herein. As an alternative, the flowchart of FIG. 3 may be viewed as depicting an example of steps of a method implemented in the computing environment 101 (FIG. 1) according to one or more embodiments.

Beginning with box 301, the query segmentation application 124 obtains a search query 131 (FIG. 1) from a client 104 (FIG. 1). This may be facilitated by an electronic commerce system 114 (FIG. 1) implementing a network page server application 117 (FIG. 1), or by another approach. Next, in box 304, the query segmentation application 124 generates segments 138 (FIG. 1) from the search query 131.

Generating the segments 138 may comprise first generating a pool of segments 138 comprising n-grams derived from the keywords of the search query 131. The query segmentation application 124 may then calculate, for each of the segments 138 in the pool of segments 138, a normalized frequency for the segments 138 with respect to a search history 144 (FIG. 1). The frequency may be normalized as a function of the n-gram components of the segments 138, or by another approach. The normalized frequencies may further be weighed as a function of a length of the segments 138, the number of keywords or n-grams included in the segment 138, a matching of the segment 138 to a taxonomy node 141 (FIG. 1) label, or by another approach.

The query segmentation application 124 may then select those segments 138 which embody a complete subdivision of the search query 131 and have a maximum aggregate normalized frequency with respect to other combinations of segments 138 embodying a complete subdivision of the search query 131. A complete subdivision of the search query 131 comprises a selection of segments 138 which may be ordered such that the component keywords or n-grams of the segments 138 may be combined to embody the search query 131 without addition or omission of a keyword. The segments 138 may also be generated from the search query 131 by another approach.

In box 307, the query segmentation application 124 generates modified search queries 131 as a version of the search query 131 with a respective one of the generated segments 138 removed. In box 309, the query segmentation application 124 communicates each of the modified search queries 131 to the search application 121 (FIG. 1) to generate an aggregate of search results 137 (FIG. 1) responsive to each of the modified search queries 131 by applying a keyword matching algorithm to titles or attributes of items 127, or by another search approaches as can be appreciated.

The query segmentation application 124 then selects relevant taxonomy nodes 141 (FIG. 1) from the aggregated search results 137 of the modified search queries 131 in box 311. In some embodiments, this comprises calculating a score for each of the taxonomy nodes 141 embodied in the aggregated search results 137 as a function of a quantity of the search results 137 included in the respective taxonomy nodes 141. The taxonomy nodes 141 may also be scored by another approach. The query segmentation application 124 may then select those taxonomy nodes 141 having a score meeting or exceeding a threshold, or satisfying some other criterion.

In box 314, the query segmentation application 124 assigns one of the relevant taxonomy nodes 141 to each of the segments 138. In some embodiments, a segment 138 is assigned the taxonomy node 141 with whose label the segment 138 shares the greatest degree of similarity. The degree of similarity may be calculated as a function of an edit distance, cosine similarity, or another value calculated with respect to a segment 138 and a taxonomy node 141 label.

In some embodiments, the segment 138 may be assigned a default taxonomy node 141 responsive to none of the relevant taxonomy nodes 141 having a degree of similarity exceeding a threshold with respect to the segment 138. The default taxonomy node 141 may comprise the taxonomy node 141 having the highest score as calculated in box 311. The default taxonomy node 141 may also be determined by another approach.

In box 317, the query segmentation application 124 communicates with the search application 121 to generate search results 137 comprising those items 127 included in the taxonomy nodes 141 assigned to the segments 138 of the search query 131. The search results 137 are then communicated to the client 104 via the network 107. Thereafter, the portion of the query segmentation application 124 ends.

Figure 4:
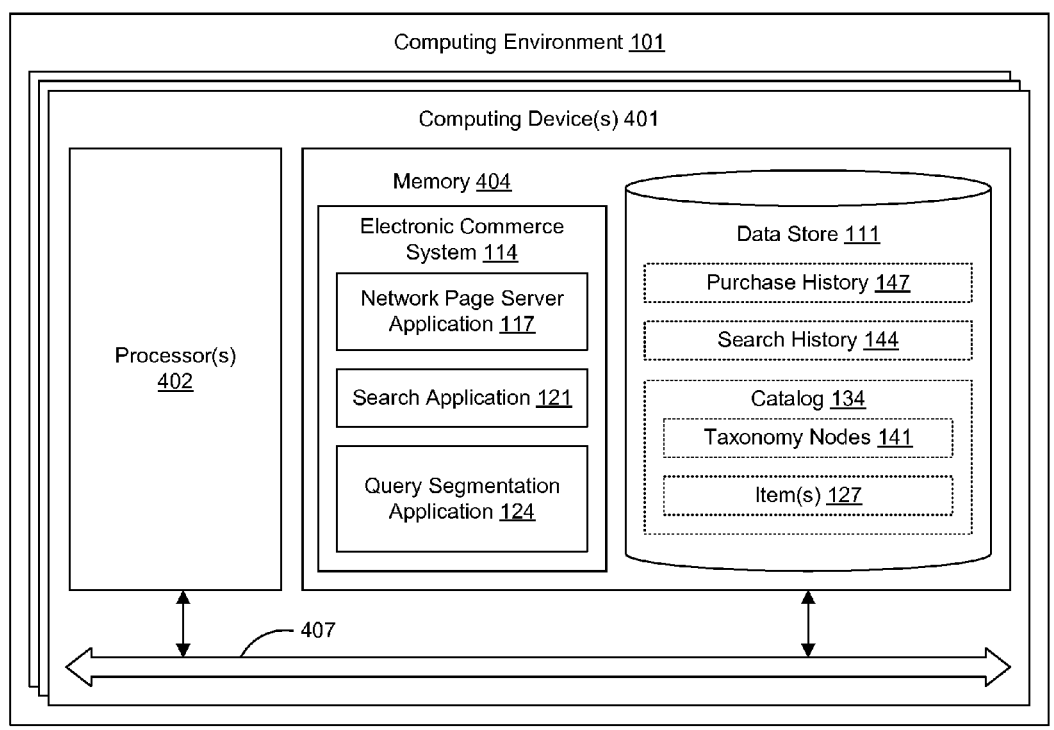
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are the electronic commerce system 114 having a network page server application 117, a search application 121, and a query segmentation application 124, and potentially other applications. Also stored in the memory 404 may be a data store 111 storing a purchase history 147, a search history 144, and a catalog 134 of items 127 organized into taxonomy nodes 141 and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the query segmentation application, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the query segmentation application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the query segmentation application, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   maintain a catalog of items accessible to an electronic commerce system, the items being organized into a plurality of taxonomy nodes;
   obtain a search query comprising a plurality of keywords from a client;
   generate all keyword combinations as a function of the keywords, the keyword combinations comprising at least one of the keywords;
   calculate a score for each of the keyword combinations as a function of a frequency of inclusion in previously obtained search queries; and
   select, as a function of the scores, a plurality of search query segments as a subdivision of the keyword combinations embodying the keywords of the search query;
   generate a plurality of modified search queries by, for each of the search query segments, excluding a respective one of the search query segments from the search query;
   generate an interim search result for each of the modified search queries and the search query;
   score each of those of the taxonomy nodes embodied in the interim search results as a function of an degree to which the interim search results comprise items included in the respective one of the taxonomy nodes; and
   select, for at least one of the search query segments, at least one of the taxonomy nodes as a function of the scores of the taxonomy nodes; and
   generate a search result comprising at least one item included in the selected at least one of the taxonomy nodes and responsive to those of the search query segments not having a selected at least one of the taxonomy nodes.

2. A system, comprising:
   at least one computing device configured to at least:
   obtain a search query from a client, the search query comprising a plurality of keywords;
   generate a plurality of search query segments from the search query, individual ones of the search query segments comprising at least one of the plurality of keywords;
   select, from a catalog comprising a plurality of taxonomy nodes and a plurality of items, a subset of the taxonomy nodes, each of the subset of the taxonomy nodes corresponding to at least one of the search query segments; and
   select at least one item from those of the plurality of items included in the selected subset of the taxonomy nodes and responsive to those of the search query segments not having a corresponding taxonomy node in the selected subset of the taxonomy nodes.

3. The system of claim 2, wherein the at least one computing device is further configured to at least communicate the selected at least one item to the client.

4. The system of claim 2, wherein selecting the subset of the taxonomy nodes further comprises:
   generating a plurality of modified search queries by removing at least one of the search query segments from the search query;
   generating a plurality of search result sets by applying a respective one of the modified search queries to the catalog;
   generating, as a function of the search result sets, a scoring of those of the taxonomy nodes embodied in the search result sets; and
   selecting the subset of the taxonomy nodes as a function of the scoring.

5. The system of claim 4, wherein the at least one computing device is further configured to at least exclude from the scored ones of the taxonomy nodes whose score does not meet a threshold.

6. The system of claim 4, wherein each of the taxonomy nodes comprises a string label, and the at least one computing device is further configured to at least:
calculate, for each of the search query segments, a plurality of string similarity values, each of the string similarity values corresponding to one of the taxonomy nodes included in the scoring, the string similarity values being calculated as a function of the respective one of the search query segments and the string label of a corresponding one of the taxonomy nodes;
associate, to each of the search query segments, one of the taxonomy nodes having a highest respective one of the string similarity values; and
wherein the subset of the taxonomy nodes comprises those of the taxonomy nodes associated with the search query segments.

7. The system of claim 6, wherein associating the one of the taxonomy nodes further comprises assigning the one of the taxonomy nodes having a highest score to one of the search query segments responsive to each of the respective string similarity values not meeting a threshold.

8. The system of claim 6, wherein the string similarity values are calculated as a function of an edit distance between the respective one of the search query segments and the string label of the corresponding one of the taxonomy nodes.

9. The system of claim 6, wherein the string similarity values are calculated as a function of cosine similarity of the respective one of the search query segments and the string label of the corresponding one of the taxonomy nodes.

10. The system of claim 2, wherein the search query segments are generated as a function of a search history.

11. The system of claim 10, wherein generating the search query segments comprises:
generating a plurality of keyword combinations;
calculating, for each of the keyword combinations, a normalized frequency of occurrence in the search history;
generating the search query segments as a selection of the keyword combinations embodying the entirety of the search query; and
wherein the search query segments are generated as a function of the normalized frequency of occurrence of a respective one of the keyword combinations.

12. The system of claim 2, wherein selecting the at least one item further comprises:
generating a modified search query by excluding from the search query those of the search query segments associated with a particular one of the subset of the taxonomy nodes; and
logic that selects the at least one item as included in the subset of the taxonomy nodes and responsive to the modified search query.

13. A method, comprising:
maintaining, by a computing device, a catalog of items accessible to an electronic commerce system, the items being organized into a plurality of taxonomy nodes;
obtaining, by the computing device, a search query from a client, the search query comprising a plurality of keywords;
generating, by the computing device, a plurality of search query segments from the search query, individual ones of the search query segments comprising at least one of the plurality of keywords;
selecting, by the computing device, a subset of the taxonomy nodes, each of the subset of the taxonomy nodes corresponding to one of the search query segments; and
generating, by the computing device, a search result comprising at least one item included in the of the selected subset of the taxonomy nodes and responsive to at least one of the search query segments not having a corresponding taxonomy node in the selected subset of taxonomy nodes.

14. The method of claim 13, generating the search query segments further comprises:
generating, by the computing device, a plurality of keyword combinations comprising at least one of the keywords;
scoring, by the computing device, the keyword combinations as a function of a frequency of inclusion in previously obtained search queries; and
selecting, by the computing device, as the search query segments, a subset of the keyword combinations comprising a subdivision of the keywords of the search query.

15. The method of claim 13, wherein selecting the subset of the taxonomy nodes further comprises:
generating, by the computing device, a plurality of modified search queries by, for individual ones of the search query segments, excluding a respective one of the search query segments from the search query;
generating, by the computing device, a plurality of interim search results corresponding to the modified search queries and the search query;
scoring, by the computing device, those of the taxonomy nodes embodied in the interim search results as a function of the interim search results; and
associating, by the computing device, at least one of the search query segments with one of the taxonomy nodes as a function of the scoring.

16. The method of claim 15, wherein the taxonomy nodes comprise a label, and the associating further comprises:
generating, by the computing device, a selection of the taxonomy nodes having a score meeting a first threshold;
calculating, by the computing device, a string similarity for each of the selected taxonomy nodes as a function of the at least one of the search query segments and the label of a respective one of the selected taxonomy nodes;
associating, by the computing device, one of the selected taxonomy nodes having a highest string similarity meeting a second threshold to the at least one of the search query segments; and
associating, by the computing device, one of the selected taxonomy nodes having a highest score to the at least one of the search query segments responsive to none of the search query segments having a string similarity above the second threshold.

17. The method of claim 15, wherein the string similarity is calculated as a maximum of an edit distance and a cosine similarity calculated with respect to the search query segment and the label of the respective one of the selected taxonomy nodes.

18. The method of claim 13, wherein the subset of the taxonomy nodes is selected as a function of a user preference, a user profile, or a user purchase history.

19. The system of claim 2, wherein the subset of the taxonomy nodes is selected as a function of a user preference, a user profile, or a user purchase history.

20. The method of claim 14, wherein the frequency of inclusion is a normalized frequency of inclusion.

21. The non-transitory computer-readable medium of claim 1, wherein the frequency of inclusion is a normalized frequency of inclusion.

* * * * *